Dec. 26, 1933.     R. H. McCAFFERTY     1,940,873
TROLLEY WIRE SPLICER
Filed April 12, 1932
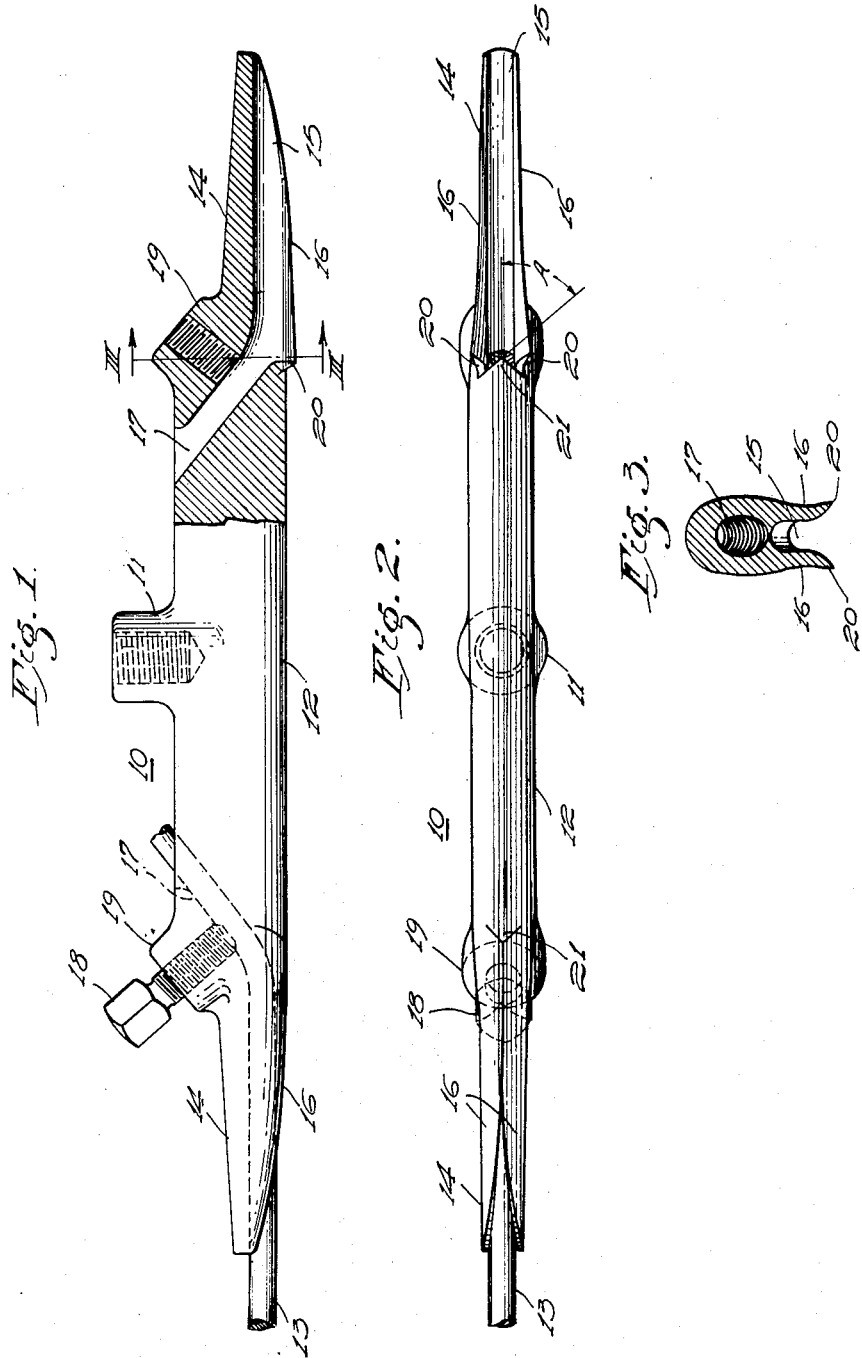
WITNESSES:
INVENTOR
Robert H. McCafferty.
ATTORNEY Patented Dec. 26, 1933

1,940,873

UNITED STATES PATENT OFFICE 1,940,873

TROLLEY WIRE SPLICER

Robert H. McCafferty, Wilkinsburg, Pa., assignor to Westinghouse Electric & Manufacturing Company, a corporation of Pennsylvania Application April 12, 1932. Serial No. 604,729

9 Claims. (Cl. 191—44.1)

My invention relates, generally, to overhead trolley wire equipment, and, more particularly, to trolley wire splicers.

The object of my invention, generally stated, is the provision of a trolley wire splicer which shall be safe, satisfactory and reliable when utilized in an overhead trolley conductor system and readily and economically manufactured and installed.

A more specific object of my invention is the provision of bendable lips integrally formed with the approach members of a trolley wire splicer to present a continuous surface to a current collector when the lips are crimped around the trolley wire.

Other objects of my invention will, in part, be obvious and, in part, appear hereinafter.

My invention, accordingly, is disclosed in the embodiment hereof shown in the accompanying drawing, and comprises the features of construction, combination of elements and arrangement of parts which will be exemplified in the construction hereinafter set forth, and the scope of the application of which will be indicated in the appended claims.

For a more complete understanding of the nature and scope of my invention, reference may be had to the following detailed description taken in connection with the accompanying drawing, in which Figure 1 is a view, in side elevation, of a trolley wire splicer constructed in accordance with this invention, parts being broken away to more clearly illustrate its construction;

Fig. 2 is a bottom plan view of the trolley wire splicer shown in Fig. 1; and

Fig. 3 is a sectional view taken along the line III—III of Fig. 1.

Referring now to the drawing, 10 designates generally the central or main body member of the trolley wire splicer which is provided on its upper side with a threaded boss 11, by means of which the splicer may be secured in position to a cross span wire in the conventional manner. The under side of the main body member 10 is shaped in the form of a runner 12, from which current may be drawn by a current collector (not shown) carried by an electric vehicle.

In order to provide for effecting the gradual transition of a current collector from the trolley wire 13 to the runner 12, approach members 14 are provided having grooves 15 and depending lips 16; the approach members 14 and the lips 16 both being preferably integrally formed with the main body member 10 as illustrated in the drawing.

The grooves 15 terminate in angularly and upwardly extending openings 17 wherein the trolley wire 13 may be positioned, as is more clearly shown at the left hand end of Fig. 1. With a view to securing the trolley wires 13 in the desired position, a set-screw 18 is provided in the threaded boss 19 and is disposed to directly engage the trolley wire 13, in the usual manner.

The gradual transition of the current collector from the trolley wire 13 to the runner 12 and back again to the trolley wire is accomplished by gradually increasing the thickness of the depending lips 16 until a maximum thickness is reached at the ends adjacent the runner 12, as shown at 20. It will also be observed that the lips 16 are thickened, as described, for the purpose of completely filling the space caused by the curving of the trolley wire 13 on entering the openings 17, thereby providing a smooth transition for a current collector, from and to the trolley wire 13.

When the lips 16 are constructed in this fashion and are severed from the runner 12, in a manner which will be hereinafter set forth in detail, they are readily bendable and may be crimped around the trolley wire 13 with but little danger that cracking or breaking will occur.

It is desirable that the trolley wire splicer be formed with the lips 16 in the positions shown at the right hand end of Figs. 1 and 2 in order that the ends of the trolley wire 13 may be readily inserted into the openings 17. After the wire 13 is in place and has been fastened by the set-screw 18, the lips 16 are then crimped around the trolley wire 13 by means of peening them with a hammer or any other suitable tool until they assume the shape shown at the left hand end of Fig. 2.

In the usual method of manufacture, the trolley wire splicer is cast as an integral unit. For purposes of economy and ease in manufacture, the lips 16 are preferably integrally formed with the approach members 14 and the ends adjacent the runner 12 are also formed integrally therewith.

In order to permit the lips 16 to be crimped around the trolley wire 13, the ends adjacent the runner 12 are severed therefrom. It has been the practice heretofore to sever the lips 16 from the runner by means of a single cut made by a saw or the like at right angles to the longitudinal axis of the splicer. When the lips are severed in this manner, it will be observed that the groove, formed as a result of the cutting operation, still remains in the under surface of the splicer with the result that a discontinuous surface is presented to a current collector in its passage from the trolley wire 13, over the approach 14 to the runner 12.

This discontinuity in the under-surface of the splicer causes disagreeable noises to be set up and conveyed to the electric vehicle travelling along and collecting current from the trolley wire 13. Furthermore, a cumulative wearing effect is obtained because of the arcing which is caused when the current collector passes over the discontinuity which tended to increase its harmful effects.

As shown in the drawing, this difficulty has been overcome by severing the lips 16 from the runner 12 at an acute angle A with respect to the longitudinal axis of the splicer rather than by making a single cut at right angles thereto as has been the practice heretofore. In addition, the ends of the runner 12, as at 21, are formed in the shape of a V with a view to more closely interfit with the thickened, angularly-severed ends 20 of the lips 16.

As is more clearly shown at the left hand end of Fig. 2, when the lips 16 are formed and cut as set forth hereinbefore, a substantially continuous surface is provided whereby a current collector may be moved to or from the runner 12 over the lips 16 and the joints formed therebetween without encountering a discontinuity. It will also be observed that, while the cutting operation may leave a groove at the bottom of the cut, the ends 20 of the lips 16 and the corresponding V-shaped ends 21 of the runner 12 will be caused to come into intimate mutual engagement and that any opening which remains in the surface of the lower portion of the splicer will be at the sides thereof rather than at the extreme under surface. Hence, no deleterious consequences will result therefrom, since the current collector usually makes contact engagement only with the extreme under surface.

Since certain further changes may be made in the above construction and different embodiments of the invention may be made without departing from the scope thereof, it is intended that all matter contained in the above description or shown in the accompanying drawing shall be interpreted as illustrative and not in a limiting sense.

I claim as my invention:

1. A trolley wire splicer comprising a main body member and a pair of oppositely-extending grooved approach members integrally formed with the main body member, each of said approach members being provided with a pair of depending lips integrally formed with the approach members and the main body member, the ends of said lips adjacent the main body member being severed therefrom at an acute angle.

2. A trolley wire splicer comprising a main body member and a pair of oppositely extending grooved portions integrally formed with the main body member, said grooved portions being provided with downwardly-extending lips the ends of which adjacent the main body member are acute angularly formed to present a substantially continuous surface to a current collector when crimped around the trolley wire.

3. A trolley wire splicer comprising a main body member and a pair of oppositely disposed end portions integrally formed with the main body member, said end portions each being provided with a pair of downwardly-extending flange members, the space between the ends of the flange members adjacent the main body member being in the form of a groove acute angularly disposed with respect to the longitudinal axis of the splicer.

4. A trolley wire splicer comprising a central body member, oppositely disposed approach members integrally formed with the central body member, and a pair of lips depending from each of the approach members, the ends of the lips adjacent the central body member being acute angularly formed whereby a substantially continuous surface is presented for a current collector by the central body member and the lips when the lips are crimped around the trolley wire.

5. A trolley wire splicer comprising a central body member provided with a runner on its underside for engagement with a current collector and oppositely disposed approach members integrally formed with the central body member and provided with depending lips, the ends of said runner being substantially V shaped and the ends of said lips adjacent the runner having substantially the same angular formation as the ends of the runner thereby presenting a substantially continuous surface to a current collector when the lips are crimped around the trolley wire.

6. A trolley wire splicer comprising a main body member and a pair of oppositely-extending grooved approach members integrally formed with the main body member, each of said approach members being provided with a pair of integrally-formed depending lips the thickness of which increases to a maximum at the ends adjacent the main body member and the thickened ends of said lips being formed at an acute angle with respect to the longitudinal axis of the splicer.

7. A trolley wire splicer provided with grooved approach members each having integrally formed therewith a pair of depending lips the thickness of which increases to a maximum at the ends adjacent the body of the splicer and the thickened ends of said lips being acute angularly formed with respect to the longitudinal axis of the splicer.

8. A trolley wire splicer comprising a main body member, a pair of oppositely extending grooved approach members integrally formed with the main body member, the grooves in the approach members terminating in openings extending angularly upwardly through the main body member, retaining means mounted on the main body member for securing the trolley wire in the grooves and openings in the main body member, and a pair of downwardly-extending lips integrally formed with each of the approach members, the thickness of the lips increasing to a maximum at the ends adjacent the main body member and the thickened ends of said lips being acute angularly formed with respect to the longitudinal axis of the splicer.

9. A trolley wire splicer comprising a central body member provided with a runner on its underside having substantially V shaped ends for engagement with a current collector and a threaded boss on its upper side whereby the splicer is supported, a pair of oppositely disposed grooved approach members integrally formed with the central body member, the grooves in the approach members terminating in openings extending angularly upwardly through the main body member, retaining means mounted on the main body member for securing the trolley wire in the grooves and openings in the main body member, and a pair of downwardly extending lips integrally formed with each of the approach members, the thickness of the lips increasing to a maximum at the ends adjacent the runner and the thickened ends of said lips having substantially the same angular formation as the ends of the runner thereby presenting a substantially continuous surface to the current collector when the lips are crimped around the trolley wire.

ROBERT H. McCAFFERTY.